United States Patent [19]

Petersen

[11] Patent Number: 4,504,872

[45] Date of Patent: Mar. 12, 1985

[54] DIGITAL MAXIMUM LIKELIHOOD DETECTOR FOR CLASS IV PARTIAL RESPONSE

[75] Inventor: David A. Petersen, Berkeley, Calif.

[73] Assignee: Ampex Corporation, Redwood City, Calif.

[21] Appl. No.: 465,042

[22] Filed: Feb. 8, 1983

[51] Int. Cl.³ .............................................. G11B 5/09
[52] U.S. Cl. ......................................... 360/40; 371/30
[58] Field of Search .................... 371/30, 43; 360/39, 360/40; 375/18, 14

[56] References Cited

U.S. PATENT DOCUMENTS

| | | | |
|---|---|---|---|
| 2,813,259 | 11/1957 | Burkhart | 371/63 |
| 3,237,160 | 2/1966 | Mitchell | 371/26 |
| 3,344,353 | 9/1967 | Wilcox | 371/69 |
| 3,582,880 | 6/1971 | Beausoleil et al. | 371/69 |
| 3,618,020 | 11/1971 | Parker | 371/63 |
| 3,732,541 | 5/1973 | Neubauer | 371/69 |
| 3,842,399 | 10/1974 | Kneuer et al. | 371/69 |
| 3,947,767 | 3/1976 | Koike et al. | 375/18 |
| 4,006,467 | 2/1977 | Bowman | 371/2 |
| 4,039,813 | 8/1977 | Kregness | 371/26 |
| 4,097,687 | 6/1978 | Yamaguchi | 375/18 |
| 4,163,209 | 7/1979 | McRae | 376/1 |
| 4,195,318 | 3/1980 | Price et al. | 360/39 |
| 4,215,335 | 7/1980 | Doi et al. | 371/69 |
| 4,225,961 | 9/1980 | Raggenbass et al. | 371/36 |
| 4,227,175 | 10/1980 | Newman | 371/69 |
| 4,283,786 | 8/1981 | Okamura | 371/2 |
| 4,315,331 | 2/1982 | Lemoine et al. | 371/31 |
| 4,330,799 | 5/1982 | Price | 360/40 |
| 4,349,904 | 9/1982 | Janssen et al. | 371/69 |
| 4,367,495 | 1/1983 | Mita et al. | 360/39 |
| 4,399,474 | 8/1983 | Coleman, Jr. | 360/46 |

OTHER PUBLICATIONS

Lender, Adam, "Correlative Level Coding for Binary-Data Transmission," IEEE Spectrum, Feb. 1966, pp. 104–115.

Smith, James W., "Error Control in Duobinary Data Systems by Means of Null Zone Detection," IEEE Transactions on Communication Technology, vol. COM-16, No. 6, Dec. 1968, pp. 825–830.

Kobayashi, Hisashi, "Correlative Level Coding and Maximum-Likelihood Decoding", IEEE Transactions on Information Theory, vol. IT-17, No. 5, Sep. 1971, pp. 586–594.

Forney, G. David, "Maximum-Likelihood Sequence Estimation of Digital Sequences in the Presence of Intersymbol Interference," IEEE Transactions on Information Theory, vol. IT-18, No. 3, May 1972, pp. 363–378.

(List continued on next page.)

*Primary Examiner*—Charles E. Atkinson
*Attorney, Agent, or Firm*—Charles M. Carman, Jr.; Joel D. Talcott

[57] ABSTRACT

A high speed all digital detector for Class IV partial response signalling, particularly to such detector wherein the detector recorded signals are precoded, is based upon a recognition that $1-D^2$ filters correspond to a pair of $1-D$ filters responsive to alternate bits. A detector in accordance with the present invention includes a decision making circuit for maximum likelihood sequence estimation (MLSE) that has operated at a speed of at least 120 megabits per second. Such a detector makes decisions by comparing a current signal sample $S_n$ with a stored, or pointer, signal sample $S_p$ and the prior state $(T_{IN})$ of the system. When a decision as to a current sample can be made, the decision is stored serially in a memory for later reading out as part of a completely detected stream. When a decision cannot be made as to a current sample, the current sample is stored with an indication of the position of that sample in the data stream. When a decision cannot be made as to a current sample, the detector can make a decision in respect to the last stored sample (before it is replaced by the current sample) and that decision is stored in memory at the previously indicated position for later readout in proper sequence.

6 Claims, 6 Drawing Figures

OTHER PUBLICATIONS

Forney, Jr., G. David, "The Viterbi Algorithm", Proceedings of the IEEE, vol. 61, No. 3, Mar. 1973, pp. 268-278.

Kabal, Peter and Subbarayan Pasupathy, "Partial Response Signaling", IEEE Transactions on Communications, vol. COM-23, No. 9, Sep. 1975, pp. 921-934.

Pasupathy, Subbarayan, "Correlative Coding: A Bandwidth-Efficient Signaling Scheme", IEEE Communications Society Magazine, Jul. 1977, pp. 4-11.

Acampora, Anthony S., and R. P. Gilmore, "Analog Viterbi Decoding for High Speed Digital Satellite Channels," IEEE Transactions on Communications, vol. COM-26, No. 10, Oct. 1978, pp. 1463-1470.

Kobayashi, H. and D. T. Tang, "Application of Partial-Response Channel Coding to Magnetic Recording Systems," IBM J. Res. Develop., Jul. 1980, pp. 368-375.

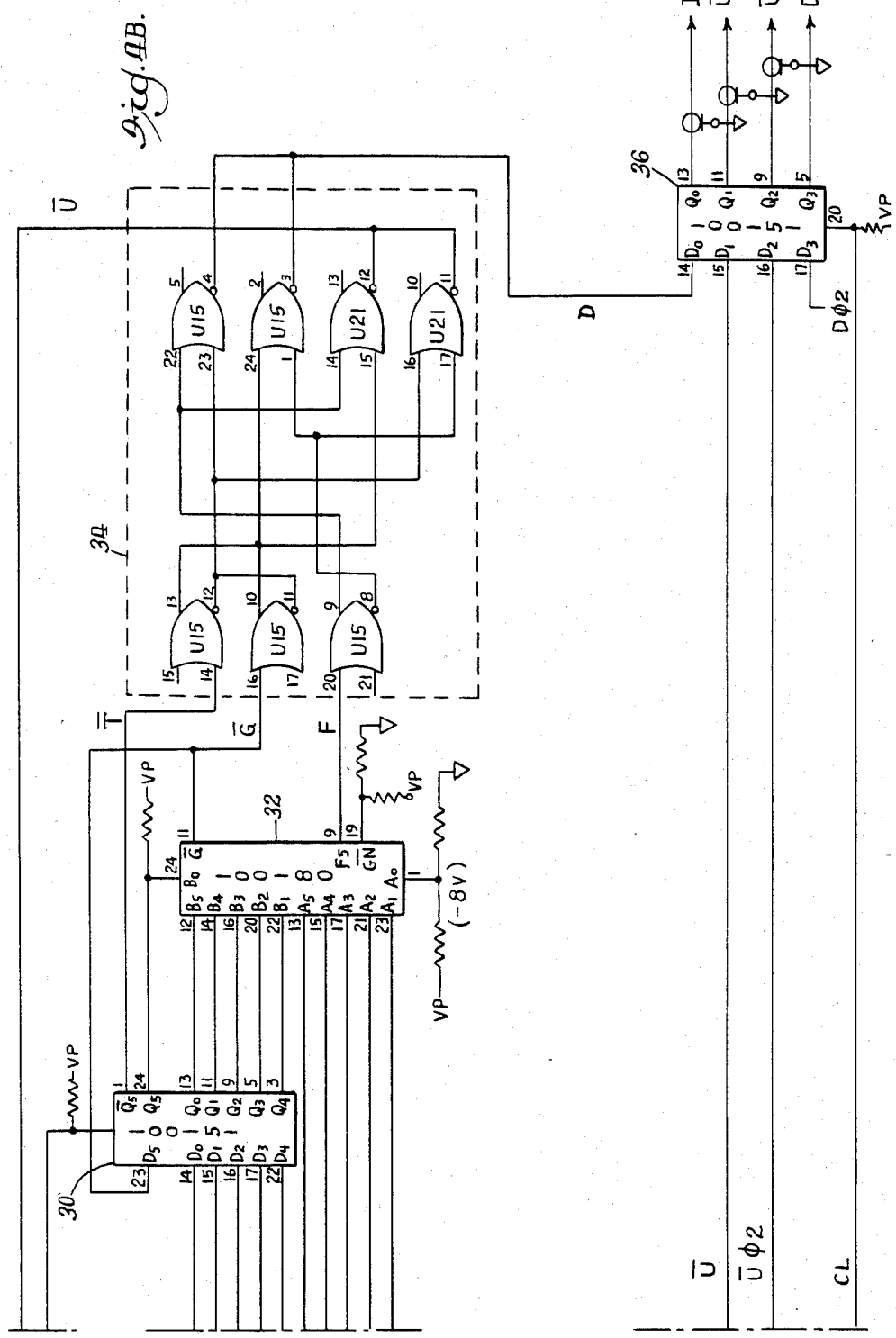

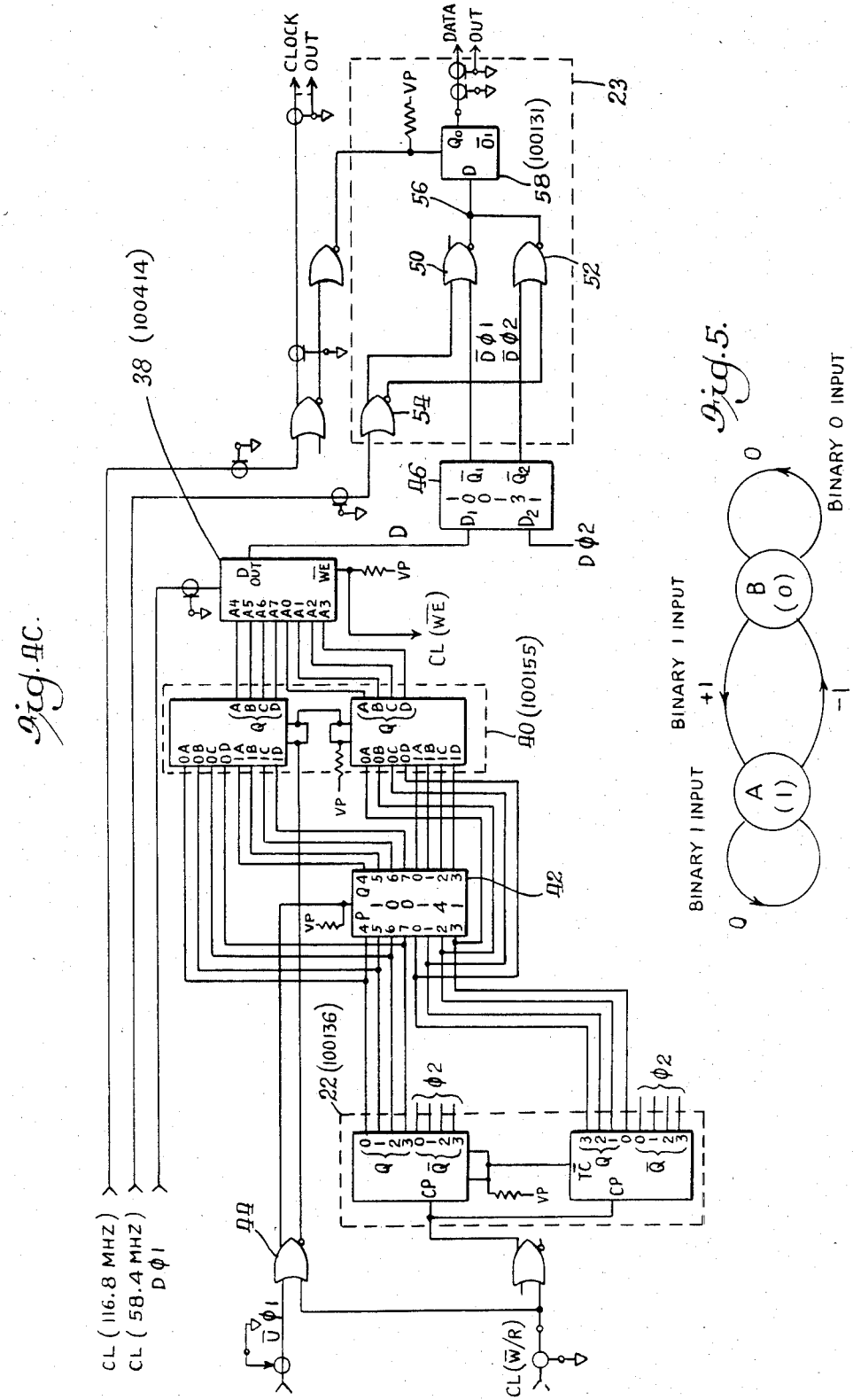

DIGITAL MAXIMUM LIKELIHOOD DETECTOR FOR CLASS IV PARTIAL RESPONSE

The present invention relates to detection in partial response signalling and more particularly to digital detection in Class IV partial response signalling in high density digital tape recording.

BACKGROUND OF THE INVENTION

Partial response signalling, also known as correlative coding, is a technique used in digital communication for high symbol rate packing, that is, for approaching the maximum utilization of a given bandwidth. This is particularly important for ultrahigh density digital recording. Such signalling introduces controlled intersymbol interference whereby the effect of the known interference can be removed. A particular class of partial response signalling is known as Class IV partial response signalling or modified duobinary signalling. It is also known as $1-D^2$ signalling as it utilizes a transversal filter wherein a second previous symbol is subtracted from the present symbol.

In Class IV partial response signalling it is conventional to provide precoding of binary data before recording. Such precoding involves changing the binary data to a precoded binary data stream whereby the $1-D^2$ signalling introduces controlled intersymbol interference in a manner that permits relatively simple decoding while decreasing the propagation of errors.

In digital tape recording of the sort in which a preferred embodiment of the present invention finds application, the digital binary data stream is precoded into a precoded binary data stream, which is recorded in binary form on magnetic tape. The data is precoded so that the decoding sections may decode transitions in ternary state as binary 1's. The data are later read from the tape by a pickup head which produces an analog signal that necessarily includes a certain amount of noise, mostly occasioned by the recording tape, the pickup head, and the preamplifier. The received analog data are then passed through a $1-D^2$ filter and sampled at particular intervals to provide controlled intersymbol interference. For playback data that were recorded at high linear packing density (approximately 45 KBPI), the Class IV partial response filter acts, to first order, as a matched filter for the record/playback process, resulting in an improved signal to noise ratio. This results in a ternary data stream in which there are three signal levels, commonly referred to as $+1, 0, -1$. The problem is that noise and changes in signal strength prevent the sampled signals from being exactly at each level. Changes in signal strength are readily eliminated by a form of normalization, sometimes referred to as envelope tracking. The effect of noise is reduced by detecting in accordance with some scheme. One common scheme in the prior art is simply to sample the analog ternary response appropriately and decode a bit as 0 if the absolute value is less than 0.5 and decode the bit as 1 if the absolute value is greater than 0.5. Other schemes involve what is known as maximum likelihood detection.

Such Class IV partial response signalling, precoding and maximum likelihood detection are explained at some length in the literature: P. Kabal et al., "Partial-Response Signalling," IEEE Transactions on Communications, Vol. Com-23, No. 9, September 1975, pp. 921-934; S. Pasupathy, "Correlative Coding, A Bandwidth-Efficient Signaling Scheme," IEEE Communications Society Magazine, July 1977, pp. 4-11; H. Kobayaski, "Correlative Level Coding and Maximum-Likelihood Decoding." IEEE Transactions on Information Theory, Vol. IT-17, No. 5, September 1971, pp. 586-594; G. D. Forney, Jr., "The Viterbi Algorithm," Proceedings of the IEEE, Vol. 61, No. 3, March 1973, pp. 268-278. An analog detection scheme is set forth in A. S. Acampora et al., "Analog Viterbi Decoding for High Speed Digital Satellite Channels," IEEE Transactions on Communications, Vol. Com-26, No. 10, October 1978, pp. 1463-1470.

In certain instances where the references refer to decoding, they refer to what is characterized herein as detecting, for a preferred embodiment of the present invention has been designed for use in a tape recording system as generally described in the patent application of Roger William Wood and Charles L. Matson filed this day for Encoder Verifier, in which patent application the component referred to as a decoder is another part of the system, the present invention being useful in the detection section of such system.

SUMMARY OF THE INVENTION

The present invention is directed to a high speed all digital detector for Class IV partial response signalling, particularly to such detector wherein the recorded signals are precoded. The invention is based upon a recognition that $1-D^2$ filters correspond to a pair of $1-D$ filters responsive to alternate bit periods. A detector in accordance with the present invention includes a decision making circuit for maximum likelihood sequence estimation (MLSE) that has operated at a speed of at least 120 megabits per second. Such a detector makes decisions by comparing a current signal sample $S_n$ with a stored, or pointer, signal sample $S_p$ and the prior state $(T_{IN})$ of the system. When a decision as to a current sample can be made, the decision is stored serially in a memory for later reading out as part of a completely detected stream. When a decision cannot be made as to a current sample, the current sample is stored with an indication of the position of that sample in the data stream. When a decision cannot be made as to a current sample, the detector can make a decision in respect to the last stored sample (before it is replaced by the current sample) and that decision is stored in memory at the previously indicated position for later readout in proper sequence.

It is, therefore, a primary aspect of the present invention to provide a detector for operating a very high speed, for example, at about 120 megabits per second. Such high speeds are made possible by dividing the detector into two parts and providing a simple decision making circuit that can operate more rapidly than detecting circuits of the prior art.

BRIEF SUMMARY OF THE DRAWINGS

Other aspects and advantages of the present invention will be apparent from the detailed description of the invention, particularly when taken in conjunction with the accompanying drawings, in which:

FIG. 4 is a circuit diagram of one phase of the detector illustrated in FIG. 3, including in FIG. 4A an analog to digital converter, in FIG. 4B a decision making circuit involving comparison of signals $S_n$ and $S_p$, and in FIG. 4C memory circuits; and FIG. 5 is a ternary state diagram for 1-D partial response.

DETAILED DESCRIPTION

Figure 1:
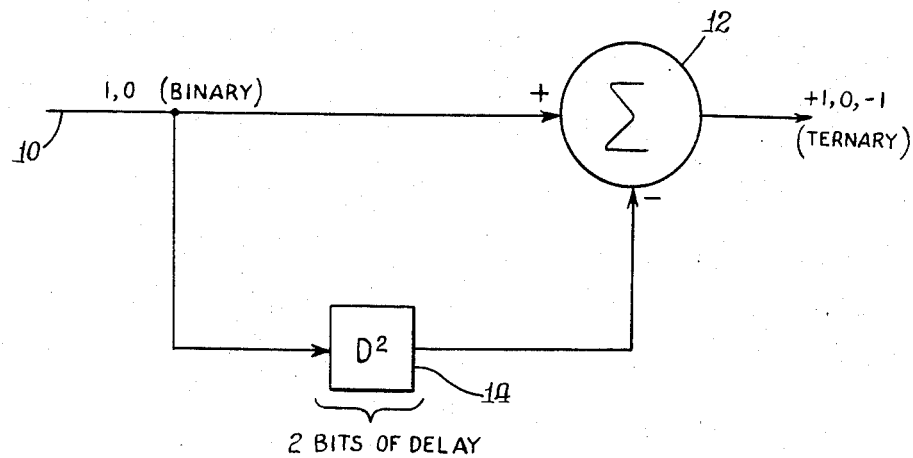
FIG. 1 is a block diagram of a $1-D^2$ Class IV partial response filter used to produce coded signals of the sort detected by the detector of the present invention.

As stated above, the present invention finds application in Class IV partial response signalling, in which 1-$D^2$ filters are used. Such filters are illustrated by the generalized circuit of FIG. 1. Binary signals in analog form from a tape recorder are applied on an input line 10. Such signals are applied simultaneously to a subtraction circuit 12 and a delay line 14 which delays the signal 2 bit periods. The delayed signal is applied to the subtraction circuit 12, which subtracts the delayed signal from the current signal to produce an equalized output signal in ternary form in accordance with the well-known principles of Class IV partial response signalling as set forth in the references mentioned above. A preferred embodiment of the present invention detects such signals and outputs binary data corresponding to the binary data before precoding.

It is self-evident from the manner of operation of the 1-$D^2$ filter that odd and even bits are not correlated. That is, if the current bit is an odd bit, so is the bit delayed 2 bit periods with which it is combined, and if the current bit is an even bit, so is the delayed bit with which it is combined. The significance of this is that the 1-$D^2$ filter is equivalent to a pair of interleaved 1-D filters each operating on alternate data bits at half the frequency and twice the delay, one operating on odd, or phase 1 ($\phi$1), data bits and the other on even, or phase 2 ($\phi$2), data bits.

As stated above, detecting according to the present invention is based upon decision making according to maximum likelihood sequence estimation (MLSE). The decisions are based upon a current sample signal $S_n$ in comparison with a pointer signal $S_p$ and the prior state $T_{IN}$ system. In the preferred embodiment illustrated, the signal $S_p$ is simply a prior sample signal. The sample signals are taken from the output of the Class IV partial response filter at the particular instants in the respective signal cycles that provide controlled intersymbol interference. This instant may be set by adjusting the phase of sampling clock pulses empirically for the best detection. This may be determined by looking at the eye of the ternary signal on an oscilloscope and setting the clock phase so that the sampling clock pulse occurs at the widest opening of the eye. See the reference "Correlative Coding: A Bandwidth-Efficient Signaling Scheme" for further explanation of the eye.

Figure 2:
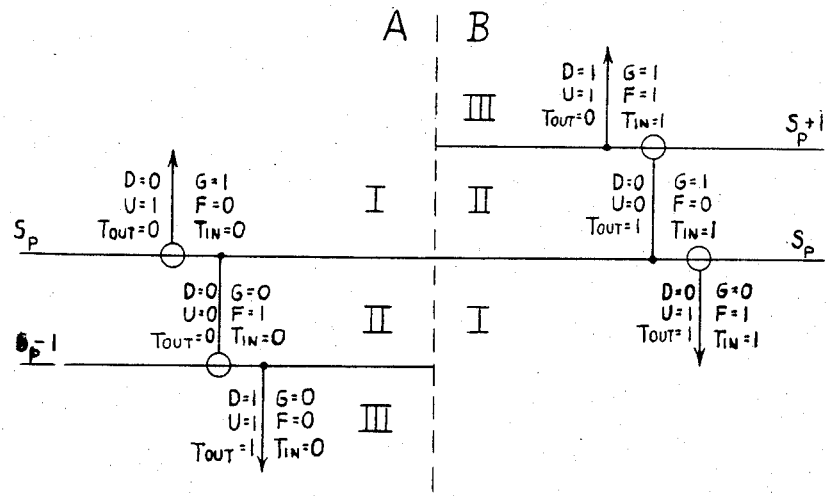
FIG. 2 is a diagrammatic illustration of the bases for decision upon comparison of signals $S_n$ and $S_p$.
Figure 3:
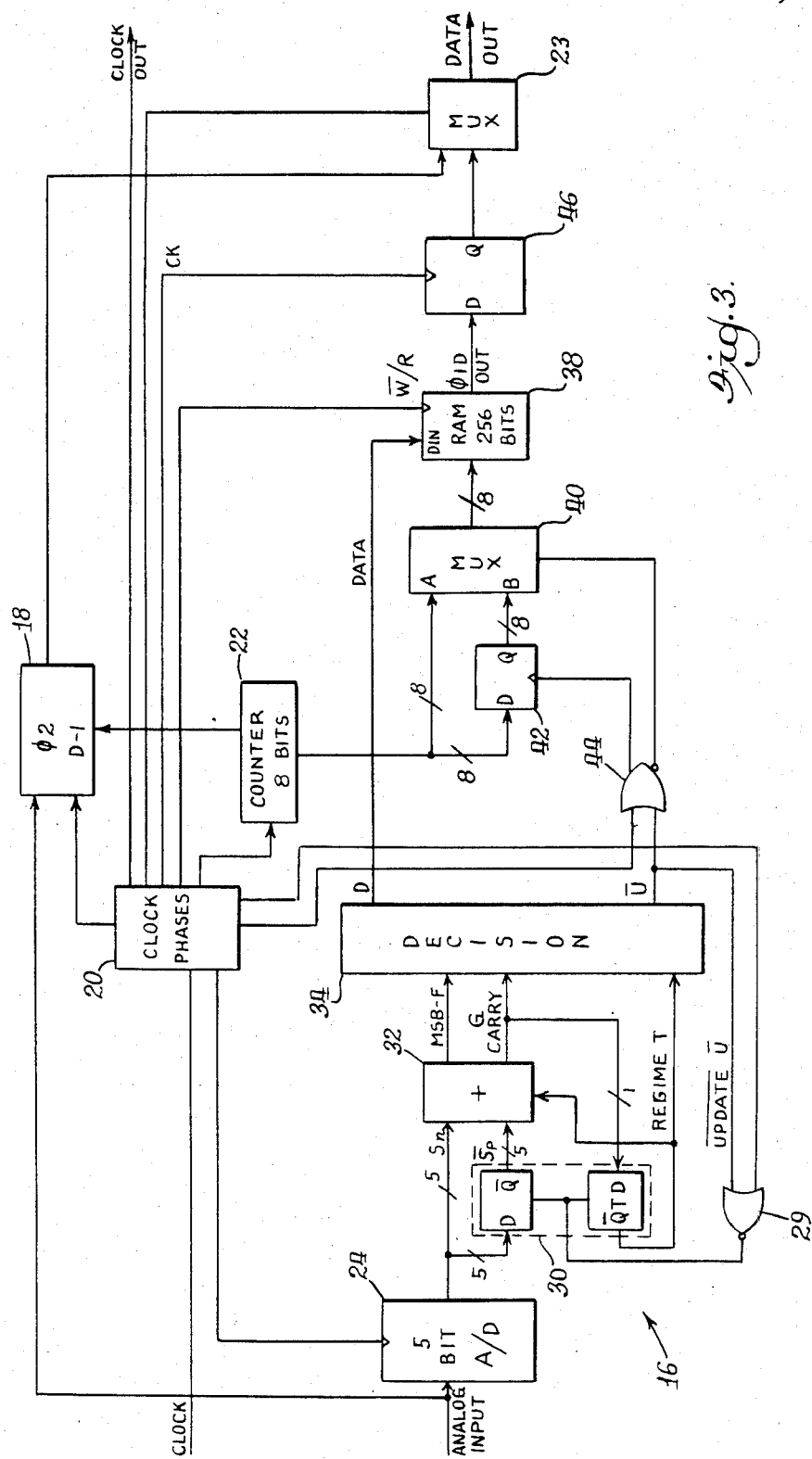
FIG. 3 is a block diagram of a digital detector in accordance with the present invention.
Figure 9A:
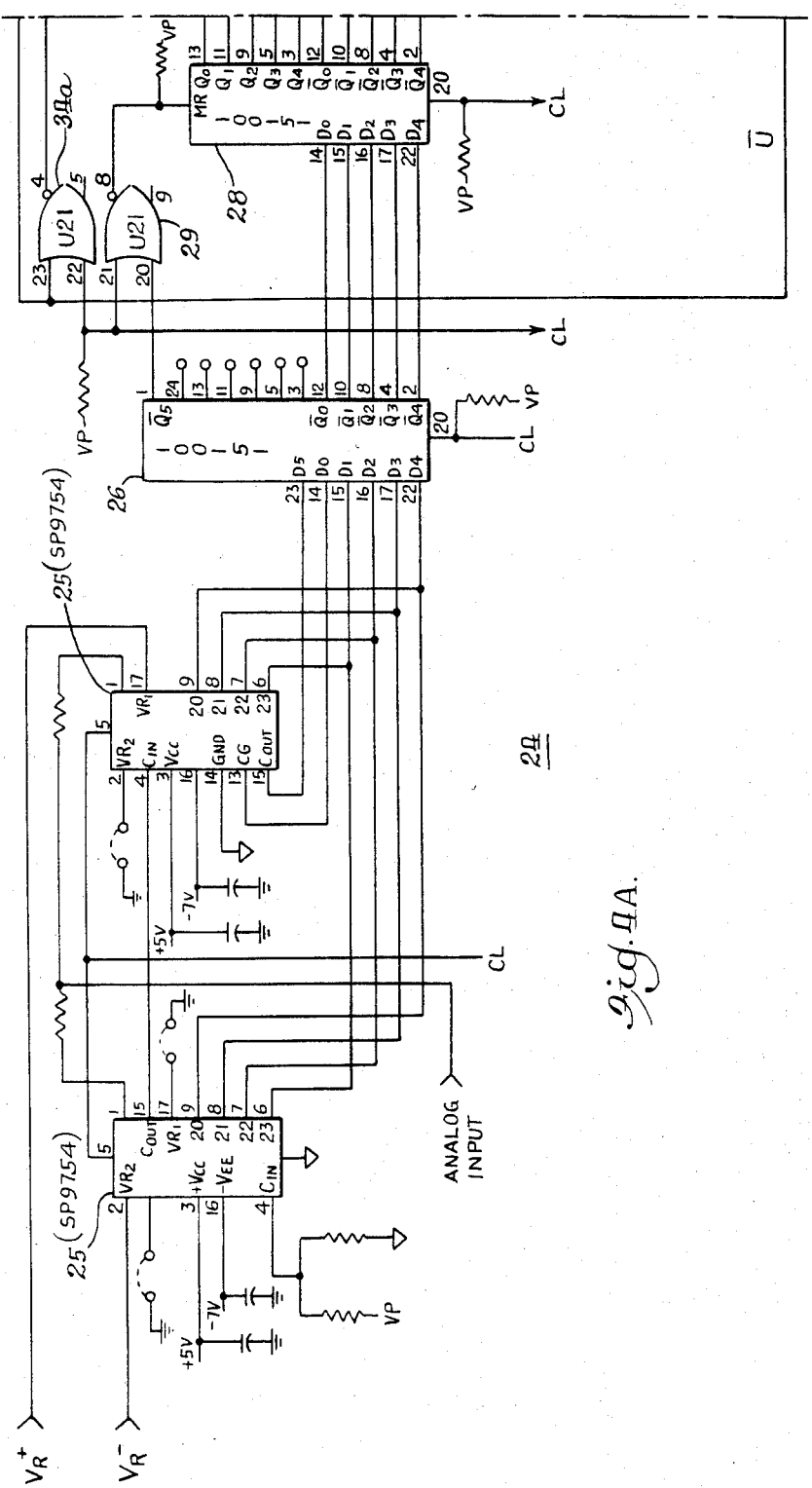

FIG. 2 is a diagrammatic illustration of the decision making operation of the preferred embodiment of the present invention shown in FIGS. 3 and 4. FIG. 2 shows all possible values of the current sample signal $S_n$ relative to a stored prior pointer signal $S_p$, with an indication of the output signals data (D), update (U) and state ($T_{out}$) resulting from the decisions made. Such decisions are made on the basis of where the signal $S_n$ falls in respect to $S_p$. As illustrated in FIG. 2, the relationship of signal $S_n$ to signal $S_p$ occurs in two regimes, A and B, corresponding to the two states of a ternary state diagram (FIG. 5). In the particular embodiment illustrated, regime A is for the condition when $S_p$ is positive, and regime B is for the condition when $S_p$ is negative. The current regime is identified by a signal $T_{in}$, which may be developed in the manner discussed below, $T_{in}$ being 0 for regime A and 1 for regime B. Regime A represents the possible values of $S_n$ relative to $S_p$ when $S_p$ is positive or 0.0, $T_{IN}=0$. Regime B represents the possible values of $S_n$ relative to $S_p$ when $S_p$ is negative or 0.0, $T_{IN}=1$. Regime A is divided at $S_p$ and $S_p-1.0$ into three regions A-I. $S_n > S_p$
A-II. $S_p \geq S_n > S_p - 1.0$
A-III. $S_p - 1.0 \geq S_n$ Regime B is divided at $S_p$ and $S_p+1.0$ into three regions B-I. $S_p > S_n$.
B-II. $S_p + 1.0 > S_n \geq S_p$
B-III. $S_n \geq S_p + 1.0$ For reasons that will become apparent as this description continues, the detector of the present invention acts solely upon where $S_n$ falls in the regions of FIG. 2. The detection is based upon the comparison of $S_n$ and $S_p$ and the identity of the regime $S_p$ is in at the time of decision, $S_p$ being updated from time to time. As $S_p$ is changed from time to time in a given regime and is switched to the other regime from time to time, in a manner to be described further below, it represents a moving target against which the current sample signal $S_n$ is compared. Because $S_p$ represents signals in a ternary code ($+1$, 0, $-1$), its limits are $+1.0$ and $-1.0$, being from 0.0 to $+1.0$ in regime A and between 0.0 and $-1.0$ in regime B. The MLSE detector of the present invention makes decisions and provides the outputs noted in the respective regions where D represents the data output signal, U an update signal and $T_{out}$ an updated regime signal.

The detector makes decisions that a current signal $S_n$ represents a binary 0 whenever it equals $S_p$ or differs from $S_p$ in the direction of 0.0 less than 1.0. This represents the condition where $S_n$ falls in region II of either regime. A data output (D) of 0 (signified by D=0 in FIG. 2) is forthwith stored in sequential memory at the position in the memory corresponding to the current bit. The signal $S_p$ is retained as it was; that is, it is not updated (signified by U=0), nor is the regime changed (signified by $T_{out}=T_{IN}$).

When $S_n$ differs from $S_p$ by at least 1.0, which can only happen when $S_n$ is of opposite sign from $S_p$ (Regions A-I and B-I), the detector is unable to make a decision in respect to the current bit but is able to decide for the last prior indecision, that is, upon the bit corresponding to Sp. The detector decides that the stored sample represented binary 1 (D=1), updates the signal $S_p$ to the current $S_n$ (U=1) and changes regimes ($T_{out}=\overline{T_{IN}}$). At the same bit time the detector marks the point in the memory storage sequence where the data cannot be decided, and writes 1 into memory at the point previously marked for later detection.

When $S_n$ differs from $S_p$ in the same sense as $S_p$, more positive than $S_p$ in region A-III and more negative than $S_p$ in region B-III, the detector is again unable to make a decision in respect to the current bit but is able to decide for the last prior indecision. In these cases, the detector decides that the stored sample represented binary 0 (D=0), and updates the signal $S_p$ to the current signal $S_n$ (U=1), but does not change regimes ($T_{out}=T_{IN}$). As with regions A-I and B-I, at the same bit time the detector marks the point in the memory storage sequence where the data cannot be decided, and writes 0 into memory at the point previously marked for detection.

The memory is sequentially and cyclically addressed so that the data are read out from currently addressed positions and then the new data are written in at those same positions except in the event of current indecisions, in which event the current position is marked for later insertion of a detected bit and the late detected bit written in at the previously marked position. The memory must be long enough to assure decision and entry of a detected bit at a marked position before time to read it out.

In FIG. 3 is illustrated in block diagram form a digital detector for precoded Class IV partial response signalling according to a preferred form of the present invention in the manner described above. The detector is divided into two detector sections 16 and 18 each operating upon a respective half of the input samples, phase 1 and phase 2. The phase 1 section 16 is shown in greater detail in FIG. 4. The phase 2 section 18 is substantially identical thereto. The detector includes a clock phases section 20 which operates to provide clock pulses at appropriate phases for the clocking and enabling of various operating elements of the detector at the desired times. It includes appropriate delay lines, phase changers and dividers. Also included are a counter 22 and a multiplexer 23 connected to both phase 1 and phase 2 detector sections.

Data input to the detector comes from the 1-D² Class IV partial response filter as a ternary analog signal and is applied to an analog to digital (A/D) converter 24 in each section 16, 18. The data stream is equalized, and signal amplitude is tracked. Clock pulses, at a rate of 116.8 MHz in the example, are input to the clock section 20 in synchronism with the data stream. The clock section 20 divides the input clock pulses by 2 and applies pulses alternately to the A/D converters 24 of the respective sections 16, 18 so that the analog signal is sampled and converted in the respective converter at the appropriate sampling instant. This separates the input bit signals into the two phases. The explanation may now proceed in respect to the phase 1 section 16, with the understanding that the phase 2 section 18 is of the same construction operating similarly to detect the phase 2 signals.

As shown in FIG. 4A, the A/D converter 24 comprises a pair of SP9754 4-bit A/D converters 25 connected as a 5-bit analog to digital converter. The analog value of the data bit at the sampling instant is thereby converted into a 5-bit digital data signal byte. The current data signal byte is the signal $S_n$. The current 5-bit data signal $S_n$ is clocked into a latch 26, shown in FIG. 3A as a 100151 hex D flip-flop, which acts to reset the timing for all 5 bits. The complement $\bar{S}_n$ of the 5-bit data signal is then clocked into another latch 28, shown in FIG. 4A as a 100151 hex D flip-flop, which acts to output both the 5-bit data signal $S_n$ and its complement $\bar{S}_n$ as the outputs of the A/D converter 24.

A characteristic of the $S_p$ 9754 A/D converter is that when an overflow occurs in the positive direction data byte outputs go to 0. This condition is dealt with as follows:

A carry bit from pin 15 of the A/D converter 24 to pin 23 of the latch 26, when the A/D converter overflows, is clocked into the latch 26 and clocked through a NOR gate 29 to the master reset (MR) terminal of the latch 28 to set its output equal to analog +1.0, the maximum.

Signals VR+ and VR− are applied to the A/D converter 24 to normalize the conversion. Signals VR+ and VR− are produced by tracking the envelope of the signals from the Class IV partial response filter and may be called envelope tracking normalizing signals. VR+ corresponds to +1.0 in the ternary signal and VR− to −1.0. These signals normalize the conversion of the A/D converter 24 so that the signals range substantially exactly between +1.0 and −1.0. That is, an output of 11111 indicates substantially analog +1.0 and an output of 00000 indicates substantially analog −1.0. Therefore, analog 0.0 falls between 10000 and 01111.

The complementary signal $\bar{S}_n$ is clocked into another latch 30 upon the occurrence of an UPDATE (U) signal. As shown in FIG. 4B, the latch 30 may also comprise a 100151 hex D flip-flop. Hence, until the next UPDATE, the latch stores a 5-bit data complement signal which may be referred to as an old 5-bit data complement signal or pointer complement signal $\bar{S}_p$, the pointer signal being $S_p$.

The pointer complement signal $\bar{S}_p$ and the current data signal $S_n$ are applied to an adder 32, which as shown in FIG. 4B may comprise a 100180 6-bit adder. A regime signal $T_{in}$ (before decision), developed as explained below, is applied to the bit input $B_0$ of the adder 32 as an added least significant bit to the signal $\bar{S}_p$, and 1 is applied to the bit input $A_0$ as an added least significant bit to the single $S_n$. This is to take care of situations in regimes A and B where $S_n = S_p$, and assures decision symmetry. The adder 32 takes the digital difference between $S_n$ and $S_p$ and provides two significant outputs: (1) a carry signal $\bar{G}$, G being 1 when the adder overflows, and (2) a most significant bit signal F on output terminal F5. The most significant bit 1 represents 5-bit binary 10000, which corresponds to an analog difference of 1.0. The carry signal $\bar{G}$ is applied to the latch 30 and stored as the regime bit $T_{IN}$ and its complement $\bar{T}_{IN}$. Thus, F is 1 when $S_n \geq S_p + 1.0$ in  (B-III)

$S_p > S_n$  (B-I)

$S_p \geq S_n > S_p - 1.0$  (A-II)

B-III is distinguished by a carry signal G=1, for carry implies $S_n \geq S_p$. B-I and A-II are distinguished from B-III by a carry signal G=0, for absence of carry implies $S_n < S_p$. B-I is distinguished from A-II by the regime signal $T_{IN} = 1$. F is 0 when $S_n \leq S_p - 1.0$  (A-III)

$S_p < S_n$  (A-I)

$S_p \leq S_n < S_p + 1.0$  (B-II)

For the reasons given above G=1 implies A-I or B-II and G=0 implies A-III with $T_{IN}=1$ implying B-II.

The signals G, $T_{IN}$ and F may thus be used to identify the respective regions and, hence, make the necessary decisions to determine D (data), U (update) and $T_{out}$ (updated regime). Such decisions are made in a decision circuit 34 which may be, as shown in FIG. 4B, comprised of a number of OR/NOR gates for determining the regions and developing the respective outputs according to Table I:

TABLE I

| Region | G | F | $T_{in}$ | D | U | $T_{out}$ |
|---|---|---|---|---|---|---|
| A-I | 1 | 0 | 0 | 0 | 1 | 0 |

TABLE I-continued

| Region | G | F | $T_{in}$ | D | U | $T_{out}$ |
|---|---|---|---|---|---|---|
| A-II | 0 | 1 | 0 | 0 | 0 | 0 |
| A-III | 0 | 0 | 0 | 1 | 1 | 1 |
| B-I | 0 | 1 | 1 | 0 | 1 | 1 |
| B-II | 1 | 0 | 1 | 0 | 0 | 1 |
| B-III | 1 | 1 | 1 | 1 | 1 | 0 |

The output signal $\overline{U}$ in the form of its complement U is applied to a NOR gate 34a to cause the next clock pulse of proper phase to clock $\overline{S}_p$ and $T_{out}$ into the latch 30 to update $\overline{S}_p$ and $T_{IN}$. The signals $\overline{U}0$ and D are clocked into a latch 36, which also acts to clock in similar bits from the phase 2 detector section 18.

The signals D and $\overline{U}$ are then applied to the memory circuits shown in FIG. 4C. As shown in FIG. 4C, clock pulses are applied to the 8-bit counter 22 which may as shown comprise two 100136 multipurpose counting registers also used for counting for phase 2. The counter is used to develop sequential and cyclical addresses for addressing a RAM 38 to which the data bit D is applied. The RAM may be a 100414 256×1 RAM. The address outputs of the counter are applied to the RAM 38 by way of a multiplexer 40, which may be a pair of 100155 quad 2-input multiplexers with latch. The address outputs of the counter are also applied to a latch 42 which may be in the form of a 100141 8-bit universal shift register, the output of which is also applied to the multiplexer 40.

The $\overline{U}$ signal is used to enable an OR/NOR gate 44 to permit clocking pulses to clock the latch 42 and the multiplexer 40. When U=0, the clock pulse to the multiplexer chooses the pointer address stored in the latch 42 and then clocks the latch 42 to update the pointer address.

The clock phase circuit 20 supplies read/write instructions at the appropriate times to read out the data bits after a 256 bit delay, with the deferred decision data bits inserted at the appropriate places in the sequence. These bits are clocked into a latch 46 for reclocking purposes to provide sharp data pulses. The latch 46 may be a 100131 triple D flip-flop.

The output data from the phase 1 section are multiplexed with the data from the phase 2 section in the multiplexer 23, which acts to interleave the phases to recover the original data. The multiplexer 23 may comprise NOR gates 50 and 52 that are alternately enabled by clock pulses from an OR/NOR gate 54 at half clock rate. The outputs of the NOR gates 50 and 52 are combined at a wired-OR 56 and applied to a D flip-flop 58 where the recovered data are clocked out.

Clock pulses are also output.

Summarizing the operation of the digital detector shown in FIGS. 3 and 4 an analog ternary signal, as developed from a precoded binary signal off a tape recording by a Class IV partial response filter, is sampled and alternate samples are applied to respective phases of the detector. In each phase, the analog signal is converted to digital and the digital signal compared to a stored prior signal not previously decided upon. From such comparison a decision is made in respect to either the current or the stored signal, and the determined bit recorded in a sequentially and cyclically addressed memory.

If a decision is made in respect to the current signal, the result is written into a currently addressed position and the stored signal $\overline{S}_p$ is retained. If a decision is made in respect to the stored signal, the result is written into the position corresponding to the stored signal, and the current signal is then made the stored signal (which includes storage of its complement), which remains undecided. At the same time the current address is stored so that, when the stored signal is ultimately decided, the determined bit may be written into the memory in its proper sequence. The data bits are read out of memory sequentially and cyclically and data bits from the respective phases interleaved to provide the recovered data.

The described detector is particularly fast because it requires so few and simple operations as not to require much time for execution. In essence decisions require only the storage of a prior signal, its regime, and its time of occurrence and the comparison of a current signal $S_n$ with the stored signal $S_p$ or a simple function thereof, e.g., $S_p-1.0$ or $S_p+1.0$.

The described detector is part of a class of detectors for Class IV partial response signalling wherein each of two portions of the detector operate in alternate bit periods as though there were two 1-D filters. The decisions in such detector are based upon minimum total squared error and the state diagram of the ternary signals produced by 1-D filtering shown in FIG. 5.

As shown in FIG. 5, such a ternary state diagram has two states, one State A corresponding to a bit 1 stored in the one-bit delay, and the other State B corresponding to a bit 0 stored in the one-bit delay. If the system is in State A, a current binary bit 1 will produce a ternary bit 0 and leave the system in State A. If the system is in State B, a current binary bit 1 will produce a ternary bit +1 and leave the system in State A. If the system is in State A, a current binary bit 0 will produce a ternary bit −1 and leave the system in State B. If the system is in State B, a current bit 0 will produce a ternary bit 0 and leave the system in State B.

In the absence of noise, it is easy enough to change ternary into binary as all that is necessary is to note which state the system is in and each change of state. In the presence of noise it is not always clear when there is a change of state. To make a decision in the presence of noise a detector may assume the system will be in a particular state, A or B, after a current bit and then determine from minimum total squared error from which state it must come.

The decision is based upon selecting as the prior state the state that would result in minimum total squared error irrespective of the state to which it goes for the present bit. If $EA_{t-1}$ is the prior total squared error if the system is in State A upon apprival of its current bit, $EA_t$ is the total squared error if the current bit leaves the system in State A, $EB_{t-1}$ is the prior total squared error if the system is in State B upon arrival of the current bit, $EB_t$ is the total squared error if the current bit leaves the system in State B, and $S_n$ is the current sample, then the possibilities are:

If the system goes from State B to State A (ternary +1)

(BA) $EA_t = EB_{t-1} + (1-S_n)^2$

If the system goes from State A to State A (ternary 0)

(AA) $EA_t = EA_{t-1} + (S_n)^2$

If the system goes from State B to State B (ternary 0)

(BB) $EB_t = EB_{t-1} + (S_n)^2$

If the system goes from State A to State B (ternary −1)

(AB) $EB_t = EA_{t-1} + (-1 - S_n)^2$.

If the new state is State A, the minimum total squared error is the lesser of BA and AA. If the new state is State B, the minimum total squared error is the lesser of BB and AB. If the minimum total squared error is the result of going from the same state irrespective of the new state, i.e., AA and AB are minimum or BA and BB are minimum, a decision is made as to the state the system was in upon receipt of the current bit. By keeping track of the states, one can tell whether or not there has been a change of state, in which case the detector puts out binary 1 (otherwise it puts out binary 0), and retains the identification of the newly identified state as the identification of the prior state.

From the above equations it may be shown that respective minima can be determined simply from the relationships between $S_p$ and $S_n$ involving a simple comparison of $S_n$ and a linear function of $S_p$, and keeping track of the state, which may determined from the signal $T_{IN}$.

Although a preferred embodiment of the invention has been described in some detail, various modifications may be made therein within the scope of this invention. It should be noted that where appropriate the nomenclature can be inverted; that is, the signals referred to may be used as their complements by corresponding circuit elements. Binary senses 1 and 0 in the output can thus sometimes be the other way around. Normalizing of the ternary signal may use any convenient measure as unity. A/D conversion can be made with more or less than 5 bits, with a consequence slightly less or greater error rate.

In the specific implementation described above, the amplitude of the input samples was hard-limited to an absolute value of less than or equal to 1.0. Greater limits on the excursion of input values may be used, provided appropriate changes are made in the implementation. A difference of 1.0 need not be represented by 10000 if other implementation is used following the principles of the present invention.

What is claimed is:

1. A digital detector with dual detecting means for Class IV partial response signalling in which precoded binary data are recorded, played back and equalized, and filtered using a Class IV partial response filter to place the data in the form of successive analog ternary values in which any transitions between ternary states in the detecting means represents a binary bit of one sense, said detector comprising, A/D converter means for sampling said ternary values and converting said sampled values into respective multi-bit digital sample signals $S_n$ normalized to the form (+1.0, 0.0, −1.0) with alternate digital sample signals split into respective data streams;

first and second detecting means each responsive to sample signals $S_n$ of a respective one of said data streams, each of said first and second detecting means including signal storage means for storing one of said sample signals $S_n$ as a respective stored sample signal $S_p$, state means for storing a state signal $T_{IN}$ as an indication of the state at the time of the storing of the corresponding signal sample $S_p$, comparison means for comparing a current signal sample $S_n$ with a selected predetermined linear function of the stored signal sample $S_p$, which function is selected according to the stored signal $T_{IN}$, said comparison means providing an output binary signal of said one sense when there is a change of ternary state and otherwise an output binary signal of the other sense, said comparison means further providing an update signal U and a state signal $T_{out}$, addressable memory means, means for addressing positions in said memory means successively and cyclically, means for reading out data bits from successively addressed positions, means for thereafter writing said output binary signals into addressed positions in said memory means, address storage means coupled to said means for addressing and operating when enabled to store the address from said means for addressing, and means responsive to said update signal U for updating the stored signal $S_p$ by storing the current signal $S_n$, storing the current state signal $T_{out}$ in the state means, and coupling said address storage means to said memory means in lieu of said means for normally addressing while said means for writing writes in a data bit, and thereafter enabling said address storage means to receive an updated address, and multiplexing means for interleaving the data bits read out of the respective detecting means.

2. A digital detector in accordance with claim 1 wherein the comparison function for ternary state A is
  I. $S_n > S_p$
  II. $S_p \geq S_n > S_p - 1.0$
  III. $S_p - 1.0 \geq S_n$
and for State B
  I. $S_p > S_n$
  II. $S_p + 1.0 > S_n \geq S_p$
  III. $S_n \geq S_p + 1.0$,
said comparison means including
  means for region A-I for outputting a binary data bit of said other sense and providing an update signal for updating said stored signal $S_p$,
  means for region A-II for outputting a binary data bit of said other sense,
  means for region A-III for outputting a binary data bit of said one sense, for providing an update signal U for updating said stored signal $S_p$, and for providing a signal $T_{out}$ indicating a change of state,
  means for region B-I for outputting a binary data bit of said other sense, and providing an update signal U for updating said stored signal $S_p$,
  means for region B-II for outputting a binary data bit of said other sense, and
  means for region B-III for outputting a binary data bit of said one sense, for providing an update signal U for updating said stored signal $S_p$, and for providing a signal $T_{out}$ indicating a change of state.

3. A digital detector for Class IV partial response signalling in which precoded binary data are recorded, played back and equalized, and filtered using a Class IV partial response filter to place the data in the form of successive analog ternary values, said detector comprising A/D converter means for sampling said ternary values and converting said sampled values into respective multi-bit digital sample signals $S_n$ normalized to the form (+1.0, 0.0, −1.0) with alternate digital sample signals split into respective data streams;

first and second detecting means each responsive to digital sample signals $S_n$ of a respective one of said data streams, each of said first and second detecting means including signal storage means for storing one of said sample signals $S_n$ as a respective stored sample signal $S_p$, comparison means for comparing a current sample signal $S_n$ with a stored sample signal $S_p$ and determining a bit to be a binary bit of one sense when $S_n$ differs from $S_p$ by more than 1 and of the other sense when $S_n$ differs from $S_p$ by less than 1.

4. A digital detector according to claim 3 wherein said comparison means includes means for storing said current sample signal $S_n$ in said signal storage means when $S_n$ differs from $S_p$ by more than 1 or when $S_n$ is greater than $S_p$ and of the same polarity.

5. A digital detector according to claim 4 further, including memory means, means for entering said determined bits in said memory means, means for reading said bits from said memory means in the sequence of the corresponding ternary values.

6. A digital detector for Class IV partial response signalling in which precoded binary data are recorded, played back and equalized, and filtered using a Class IV partial response filter to place the data in the form of successive analog ternary values, said detector comprising A/D converter means for sampling said ternary values and converting said sampled values into respective multi-bit digital sample signals $S_n$ normalized to the form (+1.0, 0.0, −1.0) with alternate digital sample signals split into respective data streams;

first and second detecting means each responsive to digital sample signals $S_n$ of a respective one of said data streams, each of said first and second detecting means including means for determining the ternary state of each ternary value from minimum total squared error and determining a bit to be a binary bit of one sense when the minimum total squared error indicates a change of state and of the other sense when the minimum total squared error indicated no change of state.

* * * * *

UNITED STATES PATENT AND TRADEMARK OFFICE
CERTIFICATE OF CORRECTION

PATENT NO. : 4,504,872

DATED : March 12, 1985

INVENTOR(S) : David A. Pertersen

It is certified that error appears in the above-identified patent and that said Letters Patent are hereby corrected as shown below:

Column 7, line 12, "$\bar{U}0$" should read --$\bar{U}$--;

Column 8, line 61, equation should read as follows
--(BA)  $EA_t = EB_{t-1} + (1-S_n)^2$--;

Column 8, line 65, equation should read as follows
--(AA)  $EA_t = EA_{t-1} + (S_n)^2$--;

Column 8, line 69, equation should read as follows
--(BB)  $EB_t = EB_{t-1} + (S_n)^2$--;

Column 10, line 34, equation should read as follows
--$S_p + 1.0 > S_n \geq S_p$--.

Signed and Sealed this

Twenty-seventh Day of August 1985

[SEAL]

*Attest:*

DONALD J. QUIGG

*Attesting Officer*  *Acting Commissioner of Patents and Trademarks*